J. T. WILLIS.
DEVICES FOR DETACHING HORSES.

No. 173,874. Patented Feb. 22, 1876.

UNITED STATES PATENT OFFICE.

JOSEPHUS T. WILLIS, OF PUSHMATAHA, ALABAMA.

IMPROVEMENT IN DEVICES FOR DETACHING HORSES.

Specification forming part of Letters Patent No. 173,874, dated February 22, 1876; application filed September 11, 1875.

*To all whom it may concern:*

Figure 1:
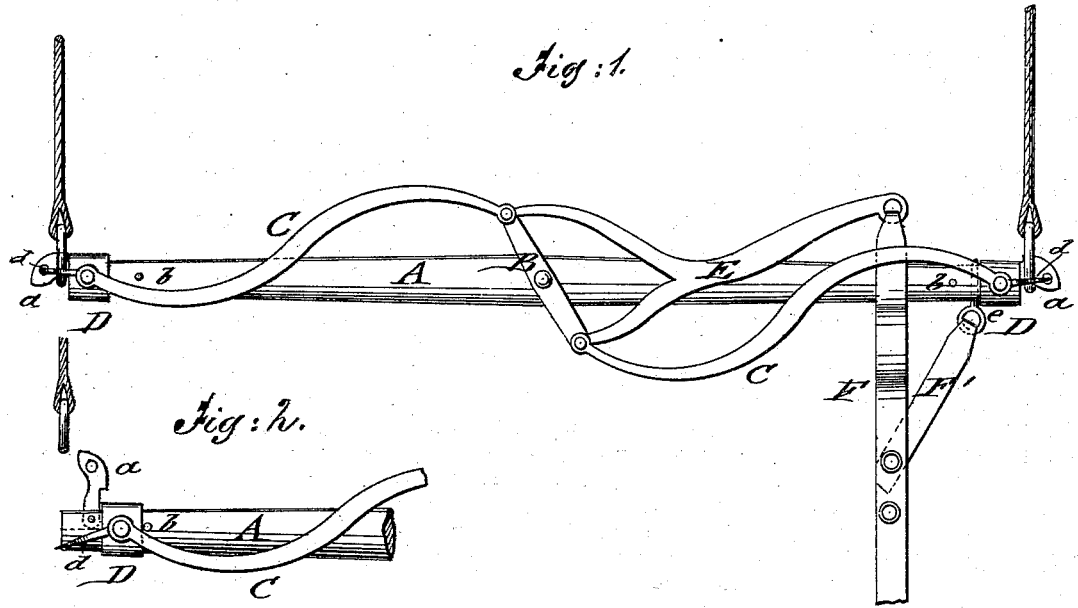
Figure 2:
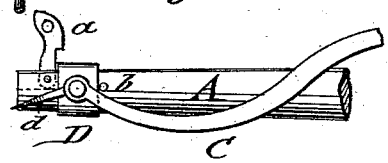

Be it known that I, JOSEPHUS T. WILLIS, of Pushmataha, in the county of Choctaw and State of Alabama, have invented a new and Improved Device for Detaching Horses, of which the following is a specification:

In the accompanying drawing, Figure 1 represents a top view of my improved device for detaching horses as applied to a whiffletree; Fig. 2, a detail top view, showing trace detached from the tug.

Similar letters of reference indicate corresponding parts.

My invention has reference to an improved device for detaching horses instantly from carriages, buggies, and other vehicles; and the invention consists of locking bands or sleeves, sliding at the ends of the whiffletree to lock or release the hooks or catches that retain the traces, the bands being moved by lever-rods connected to a fulcrumed center lever, governed by a forked lever and strap from the carriage.

A pin-strap extends from the main strap to a hole of the whiffletree, to lock the sleeve and allow the detaching of the traces only after withdrawing the pin.

In the drawing, A represents a whiffletree, which is provided at the pivot-bolt connecting it to the cross-bar or double-tree with a swinging lever, B, fulcrumed thereto. The ends of lever B are connected, by pivoted lever-rods C, with locking bands or sleeves D, sliding at the ends of the whiffletree. The sleeves D lock, when moved to the ends of the whiffletree, the pivoted trace hooks or catches *a* firmly into position, but allow, when moved back till stopped by the stop-pins *b*, the swinging forward of the hooks, and thereby the detaching of the traces.

Narrow leather strips *d*, at the ends of the lever-rods or sleeves, may be inserted into holes of the hooks, to secure the traces in the customary manner.

A forked lever, E, is pivoted to the ends of the fulcrumed lever B, and connected at its end to the governing-strap F, that passes up through guide staples or rollers to the dashboard or other convenient point of the vehicle.

A short side strap, F', with a pin, *e*, at its end, is attached to the main strap F, and passed sidewise toward the end of the whiffletree, so that the pin may be inserted into a hole of the whiffletree, back of the locking-sleeve, when in position to hold the trace hook or catch.

The pin *e* prevents any accidental detaching of the traces by entangling or contact with the lever-rods, &c., and secures the positive locking of the device until, by withdrawing the pin, the device is allowed to act.

When the governing-strap is pulled, in case of emergency, the short pin-strap is pulled at the same time, and the pin withdrawn, so that the detaching-levers can operate the sliding sleeves and detach the traces.

For two horses, the arrangement is the same on both single-trees, except that the fulcrumed lever of the other tree is reversed, in order that their ends may be turned inward, and allow one forked strap to answer for detaching both horses.

The release of the back-strap and holding-up straps from the shafts is produced by suitable tug and ring attachment, that may readily swing over the pole, and free the horses from the vehicle.

Having thus described my invention, I claim as new and desire to secure by Letters Patent—

1. The device for detaching horses from vehicles, consisting of governing-strap, forked lever, fulcrumed lever, connecting lever-rods, sliding locking bands or sleeves, and pivoted trace hooks or catches, all arranged and operating substantially as and for the purpose set forth.

2. The combination of the side strap F' and pin *e* with the governing main strap F, whiffletree A, sliding band D, as and for the purpose set forth.

JOSEPHUS T. WILLIS.

Witnesses:
R. H. HARMON,
B. F. GILDER.